(12) United States Patent
Chin et al.

(10) Patent No.: US 8,799,307 B2
(45) Date of Patent: Aug. 5, 2014

(54) CROSS-LANGUAGE INFORMATION RETRIEVAL

(75) Inventors: Jeffrey Chin, San Francisco, CA (US); Maureen Heymans, San Francisco, CA (US); Alexandre Kojoukhov, San Francisco, CA (US); Jocelyn Lin, Menlo Park, CA (US); Hui Tan, Mountain View, CA (US)

(73) Assignee: Google Inc., Mountain View, CA (US)

( * ) Notice: Subject to any disclaimer, the term of this patent is extended or adjusted under 35 U.S.C. 154(b) by 658 days.

(21) Appl. No.: 12/111,888

(22) Filed: Apr. 29, 2008

(65) Prior Publication Data

US 2008/0288474 A1 Nov. 20, 2008

Related U.S. Application Data

(60) Provisional application No. 60/938,448, filed on May 16, 2007.

(51) Int. Cl.
G06F 7/00 (2006.01)
G06F 17/30 (2006.01)

(52) U.S. Cl.
USPC ........................................... 707/760

(58) Field of Classification Search
USPC .......... 707/760, 705, 769, 722, 723; 704/2, 7, 704/8
See application file for complete search history.

(56) References Cited

U.S. PATENT DOCUMENTS

| | | | |
|---|---|---|---|
| 5,956,740 A | 9/1999 | Nosohara | |
| 6,064,951 A * | 5/2000 | Park et al. | 704/8 |
| 6,321,189 B1 | 11/2001 | Masuichi et al. | |
| 6,321,191 B1 * | 11/2001 | Kurahashi | 704/8 |
| 6,347,315 B1 * | 2/2002 | Kiyoki et al. | 707/765 |
| 6,360,196 B1 * | 3/2002 | Poznanski et al. | 704/8 |
| 6,381,598 B1 | 4/2002 | Williamowski et al. | |
| 6,594,654 B1 * | 7/2003 | Salam et al. | 1/1 |
| 7,107,204 B1 * | 9/2006 | Liu et al. | 704/2 |
| 7,640,236 B1 * | 12/2009 | Pogue | 1/1 |
| 7,720,856 B2 * | 5/2010 | Goedecke et al. | 707/759 |

(Continued)

FOREIGN PATENT DOCUMENTS

| EP | 0838765 | 4/1998 |
|---|---|---|
| EP | 0959420 | 11/1999 |

(Continued)

OTHER PUBLICATIONS

Akira Maeda, Fatiha Sadat, Masatoshi Yoshikawa, Shunsuke Uemura, Query term disambiguation for Web cross-language information retrieval using a search engine, Proceedings of the fifth international workshop on on Information retrieval with Asian languages, p. 25-32, Sep. 30-Oct. 1, 2000, Hong Kong, China.*

(Continued)

*Primary Examiner* — Alexey Shmatov
(74) *Attorney, Agent, or Firm* — Remarck Law Group PLC (57) ABSTRACT

Methods, systems, and apparatus, including computer program products, for cross-language information retrieval. A source query in a source language is received. The source query is translated into a target query in a target language. One or more target-language resources that satisfy the target query are identified. The identified resources are translated into the source language. Search results corresponding to the translated resources are presented.

19 Claims, 8 Drawing Sheets

(56) References Cited

U.S. PATENT DOCUMENTS

| | | | |
|---|---|---|---|
| 2001/0029455 A1* | 10/2001 | Chin et al. | 704/277 |
| 2002/0007384 A1 | 1/2002 | Ushioda et al. | |
| 2004/0006560 A1* | 1/2004 | Chan et al. | 707/3 |
| 2005/0209844 A1* | 9/2005 | Wu et al. | 704/2 |
| 2006/0195481 A1* | 8/2006 | Arrouye et al. | 707/104.1 |
| 2007/0022134 A1 | 1/2007 | Zhou et al. | |
| 2007/0106653 A1* | 5/2007 | Sun | 707/4 |
| 2007/0250494 A1* | 10/2007 | Peoples et al. | 707/4 |
| 2009/0125497 A1* | 5/2009 | Jiang et al. | 707/4 |

FOREIGN PATENT DOCUMENTS

| | | | |
|---|---|---|---|
| EP | 1014278 A1 | 6/2000 | |
| JP | 10232883 A | 9/1998 | |
| JP | 11219368 A | 8/1999 | |
| JP | 2002063201 A | 2/2002 | |
| JP | 2007-058706 A | 3/2007 | |
| WO | 02/01400 | 1/2002 | |

OTHER PUBLICATIONS

Supplementary European Search Report mailed May 11, 2010 from corresponding International Application No. PCT/US2008063935, 3 pages.

International Search Report mailed Oct. 30, 2008 from corresponding International Application No. PCT/US2008/063935.

Office Action mailed Jun. 24, 2010 from corresponding Chinese Patent Application No. 200880024748.8, 10 pages.

* cited by examiner

Search websites in another language

Search for: [beijing maps]

My language: [English ▼]  [Search]

Find results in: [Chinese (Simplified) ▼] — 424

Translated to: [北京地图] — 426

北京地图查询 - Beijing maps inquiries — 12,000,000 results
北京地图下载 - Beijing maps download — 10,800,000 results
北京地图电子版 - Beijing maps electronic version — 7,930,000 results
北京地图网 - Beijing Map Network — 18,100,000 results
北京地图搜索 - Beijing Map Search — 14,500,000 results
北京地图公交 - Beijing Public Transportation Map — 104,000 results
... 北京地图.

Translated results from Chinese web pages

English translation

<u>Digital Beijing</u>
www.digitalbeijing.gov.cn/searchcity/sdefault.asp - 3k - <u>Cached</u>

<u>Digital Beijing line world</u> ..........
Yellow Pages including maps, bus transfer, air perspective, motorists travel columns.
www.digitalbeijing.gov.cn/ - 7k - <u>Cached</u>

<u>New Edition -- Beijing Map</u>
Your current position : Chinese outdoor information network "" outdoor pictures "" map....City traffic, the new tour map. Copyright China outdoor pictures "" map, cell phone map, location services, China maps and atlases around CARTOGRAPHIC PUBLISHING HOUSE...
www.8264.com/77937.html - 50k - <u>Cached</u>

<u>Search dogs Sogou-- Map Search</u>
Search for maps, bus transfer, line station inquiries, autopilot, electronic maps, online maps, cell phone map, location services, China maps and atlases around the city for various services.
map.sogou.com/new/ - 13k - <u>Cached</u>

Original Chinese - <u>Hide Chinese results</u>

数字北京
www.digitalbeijing.gov.cn/searchcity/sdefault.asp - 3k - 网页快照

数字北京行天下 ..........
包括地图黄页、公交换乘、空中视角、驾车出行等栏目。
www.digitalbeijing.gov.cn/ - 7k - 网页快照

新版--北京地图
节目前的位置:中国户外资料网>>户外图片>>户外图片>>北京地图 ... 新版北京城区 交通游览地图、中国地图出版社版权所有 ...
www.8264.com/77937.html - 50k - 网页快照

搜狗Sogou--地图搜索
提供地图搜索、公交换乘、线路车站查询、自驾、电子地图、网上地图、手机地图、位置服务、中国地图和各地城市地图等多项服务。
map.sogou.com/new/ - 13k - 网页快照

CROSS-LANGUAGE INFORMATION RETRIEVAL

RELATED APPLICATIONS

This application claims the benefit under 35 U.S.C. §119 of U.S. Provisional Application No. 60/938,448, titled "Cross-Language Information Retrieval," filed May 16, 2007, which is incorporated by reference herein in its entirety.

BACKGROUND

The subject matter of this specification relates generally to search systems.

The World Wide Web ("the Web") was historically populated by predominantly English-language content. Today, with the increasing number of non-English language users and content providers, there is a significant amount of non-English content on the Web. An English speaker can benefit from access to the information and knowledge contained in the non-English content, and vice versa. Conventional machine translation tools can be used to translate content from one language to another language.

SUMMARY

In general, one aspect of the subject matter described in this specification can be embodied in methods that include the actions of receiving a source query in a source language; translating the source query into a candidate query in a first target language that is different from the source language; receiving input modifying the candidate query into a first target query in the first target language; identifying one or more resources in the first target language that satisfy the first target query; translating the identified resources into corresponding translated resources in the source language; and presenting search results corresponding to the translated resources. Other embodiments of this aspect include corresponding systems, apparatus, computer program products, and computer readable media.

In general, another aspect of the subject matter described in this specification can be embodied in methods that include the actions of receiving one or more user inputs specifying a source language, a query in the source language, and a target language; presenting a translation of the query into the target language; receiving a user input modifying the translation of the query; and presenting translations, into the source language, of one or more search results, in the target language, that satisfy the modified translation of the query. Other embodiments of this aspect include corresponding systems, apparatus, computer program products, and computer readable media.

In general, another aspect of the subject matter described in this specification can be embodied in methods that include the actions of generating a search interface on a display device, the search interface including a first field for receiving a first user input of a query in a source language, a second field for receiving a second user input specifying the source language, and a third field for receiving a third user input specifying a target language; based on the first, second, and third user inputs, generating a first results interface on the display device, first results interface including a translation, into the target language, of the query, and a fourth field for receiving a fourth user input modifying the translation of the query; and based on the first, second, third, and fourth inputs, generating a second results interface on the display device, the second results interface including translations, into the source language, of one or more search results, in the target language, that satisfy the modified translation of the query. Other embodiments of this aspect include corresponding systems, apparatus, computer program products, and computer readable media.

Particular embodiments of the subject matter described in this specification can be implemented to realize one or more of the following advantages. An interactive cross-language search allows users to modify a translated search query in order to refine search results. The cross-language search allows users with some knowledge of a target language to construct useful search queries in the target language.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 4A-4C illustrate an example user interface for cross-language content search.

Like reference numbers and designations in the various drawings indicate like elements.

DETAILED DESCRIPTION

Figure 1:
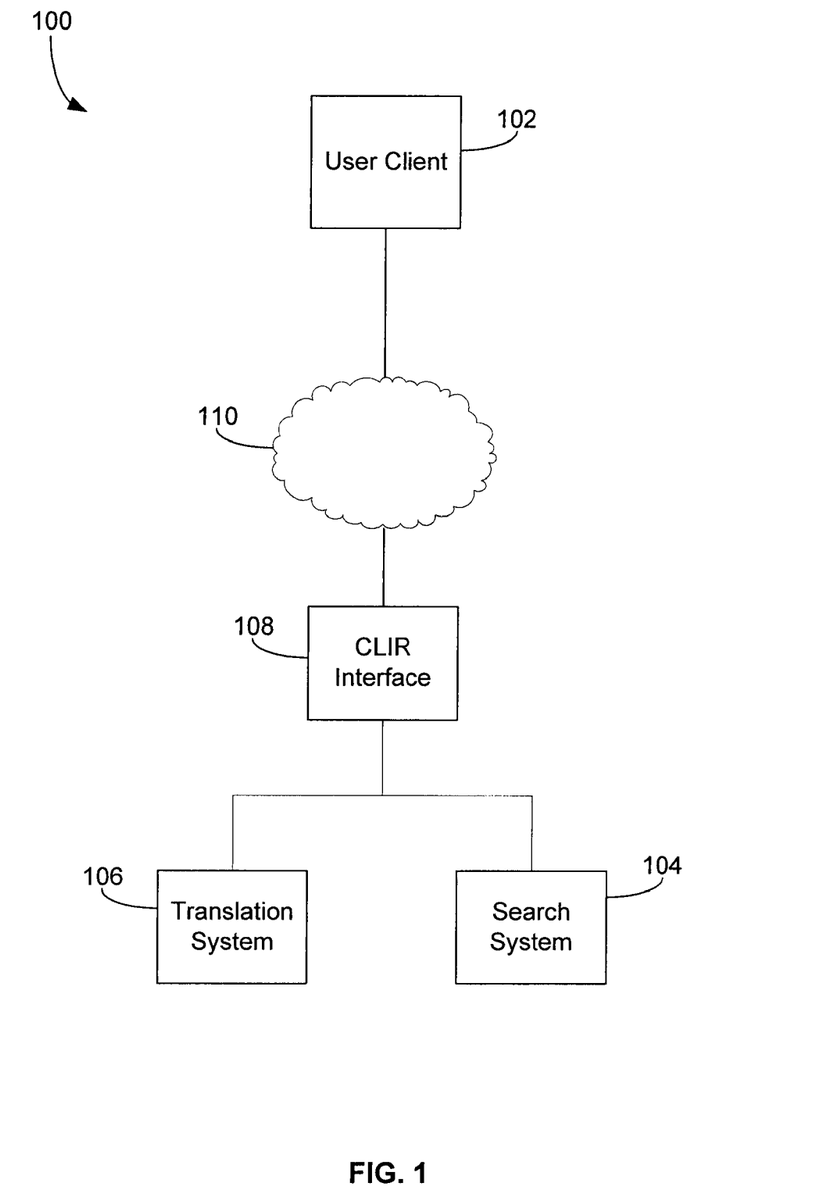
FIG. 1 is a block diagram illustrating a network environment.

FIG. 1 illustrates a network environment 100, which can include a search system 104, a translation system 106, a cross-language information retrieval (CLIR) system 108, and a user client 102. These components can communicate over one or more networks 110. The networks 110 can include local area networks, wide area networks, wireless networks, mobile phone networks, and the Internet, for example.

The search system 104 indexes resources hosted by resource servers. The search system 104 crawls the resource servers to identify resources available for indexing. In some implementations, the search system 104 also stores copies of the indexed resources. The resources crawled and indexed by the search system 104 include resources in different languages. Examples of resources include webpages, audio files, video files, Portable Document Format (PDF) documents, text files, word processing documents, images, etc. A resource can have one or more language components (e.g., text, speech, lyrics of a song, etc., which can be understood with a knowledge of a corresponding language, e.g., English, French, German, Chinese, etc.).

The search system 104 receives queries for resources (e.g., from a user client 102) and, for a respective query, searches the index for indexed resources that satisfy the respective query. A query includes one or more terms (e.g., words, phrases, characters, ideograms, numbers, etc.). The query can be presented in any of one or more languages. The search results are transmitted from the search system 104 to a user client 102 for presentation to a user. The search results can include extracts (e.g., snippets) of and links to the indexed resources that satisfy the query.

The translation system 106 translates resources from one language to another language. In some implementations, the translation system 106 can receive the resource to be translated as a direct input (e.g., text entered into a text field) or as a Universal Resource Locator (URL) to the resource to be translated. The translation system 106 can be implemented to translate resources using any of a variety of machine translation techniques (e.g., various statistical or example-based machine translation techniques). In some implementations, the translation system 106 translates resources using a statistical technique based on a particular translation model for translating resources from one language to another. In some implementations, the translation system 106 supports multiple languages. The translation system 106 receives, along with the resource to be translated, and a specification of the source language of the resource and a target language to which the resource is to be translated.

In some implementations, the CLIR interface 108 facilitates cross-language information retrieval, allowing a user to search, in one language (e.g., a language in which the user is fluent), for resources in one or more other languages. The CLIR interface 108 communicates with the search system 104 and the translation system 106. The CLIR interface 108 can receive a query in a first language from a user client 102. The received query is translated into a second language. The search results can include links to translations, from the second language to the first language, of resources that satisfy the translation of the query into the second language. The CLIR interface 108 transmits the search results to the user client 102. The search results can also include translations, from the second language to the first language, of snippets from the resources that satisfy the translation of the query into the second language.

The user client 102 can be any device that is in data communication with the CLIR interface 108 and optionally the search system 104 and the translation system 106 through the one or more networks 110. In some implementations, the user client 102 includes a client application (e.g., a web browser) that can access the CLIR interface 108, search system 104, and/or the translation system 106. Examples of user clients include desktop computers, notebook computers, tablet computers, personal digital assistants (PDAs), mobile phones, smartphones, media players, game consoles, portable gaming devices, or set-top boxes.

Figure 2:
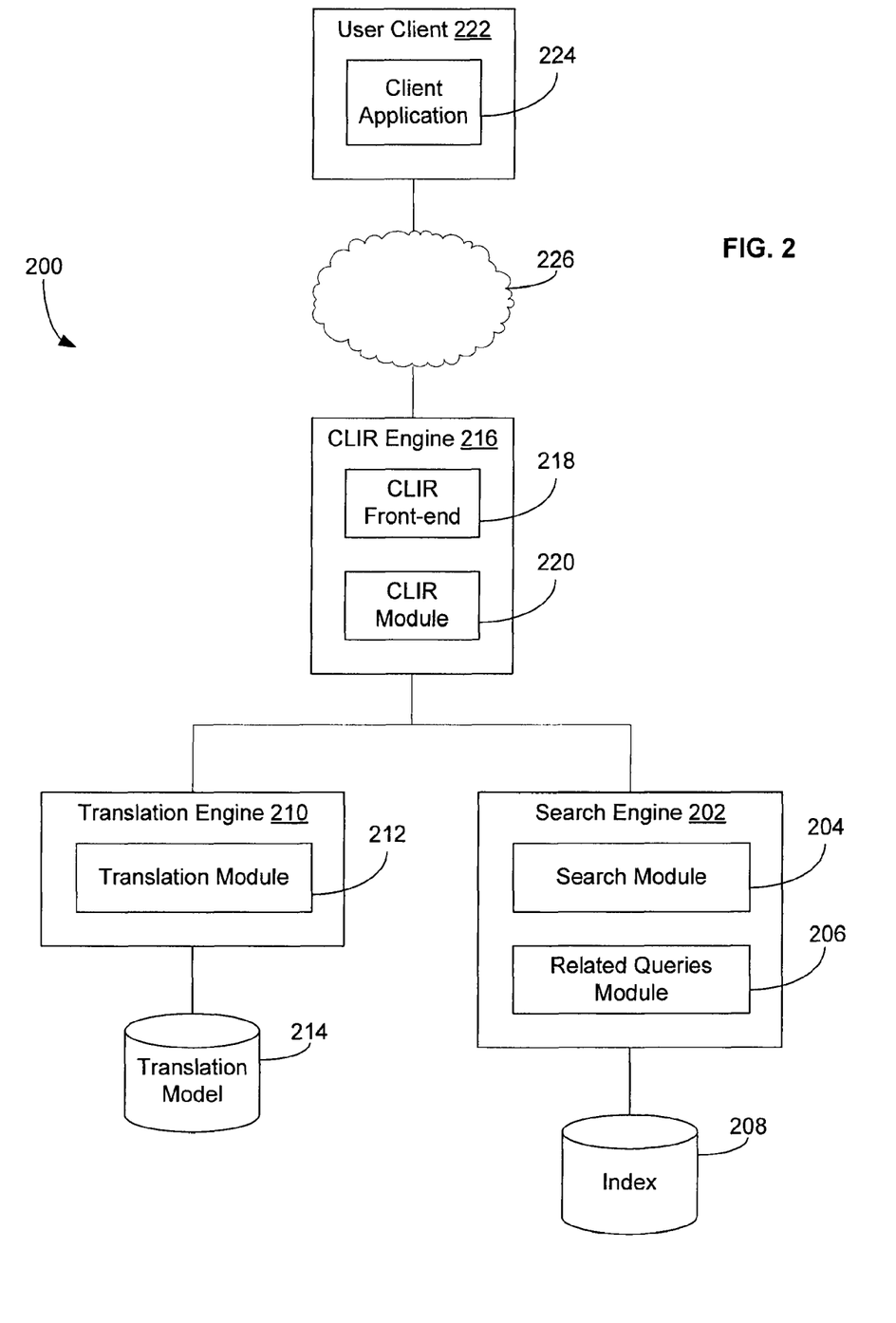
FIG. 2 is a block diagram illustrating an example cross-language information retrieval (CLIR) system.

FIG. 2 illustrates a CLIR system 200. The CLIR system 200 includes a search engine 202, a translation engine 210, and a CLIR engine 216. The search engine 202, the translation engine 210, and a CLIR engine 216 are in data communication through one or more networks 226.

The search engine 202 includes a search module 204, a related queries module 206, and an index 208 of resources. In some implementations, the search engine 202 is part of a search system (e.g., search system 104).

The search module 204 receives search queries and uses the index 208 to identify resources that satisfies the received search queries or translations of the queries. The related queries module 206 identifies, for a query, related queries. In some implementations, the related queries can include synonyms of one or more terms of the query, combinations of the query and additional terms, the query minus one or more terms, and/or reorderings of the terms in the query. In other implementations, the related queries can include one or more suggested corrections to the query (e.g., a suggested spelling correction). The index 208 is an index of resources crawled by the search engine 202. The index 208 can index resources from multiple languages. In some implementations, the search engine 202 also stores copies and/or extracts of indexed resources.

The translation engine 210 includes a translation module 212. The translation module 212 receives input text in one language and translates the input text into output text in another language. In some implementations, the translation engine 210 also includes one or more translation models 214. A translation model 214 can be used by the translation module 212 during the translation process. Different translation models 214 can be used to translate different language combinations (e.g., a different translation model can be used to translate English into French than the translation model used to translate Chinese into Arabic). In some implementations, the translation engine 210 stores the translations for later retrieval (e.g., in a cache, in a database).

The translation engine 210 can receive the text input to be translated as a direct input (e.g., a user types in the text input into an online form and submits the text, for example) or as a URL to a page that contains the text to be translated. In the case of the URL, the translation module 212 retrieves the text from the location specified by the URL and proceeds to translate the retrieved text. In some implementations, the inputs into the translation engine 210 for translation also includes queries received by the search engine 202.

In some implementations, the translation engine 210 is part of a translation system (e.g., translation system 106).

The CLIR engine 216 includes a CLIR front-end 218 and a CLIR module 220. The CLIR front-end 218 generates the user interface of the CLIR engine. For example, in some implementations, when a user accesses a CLIR engine 216 from a client application 224, the user interface that is displayed by the client application 224 is generated by the CLIR front-end 218. The CLIR module 220 performs cross-language searches for content, as will be described in more detail below.

In some implementations, the CLIR engine 216 is part of a CLIR interface (e.g., CLIR interface 108).

In some implementations, the CLIR engine can provide a user interface in different languages (e.g., a user interface in Chinese or a user interface in English, for example). Further, the language of the user interface need not be the same as the source language of the query or the target language of the content corresponding to the search results.

The user client 222 can be a device that provides access to the CLIR engine 216 and optionally the search engine 202 and the translation engine 210 through the networks 226. The user client 222 can include a client application 224 that can present the user interfaces generated by the CLIR front-end 218. In some implementations, the client application 224 is a web browser, and the user interface generated by the CLIR front-end 218 is a web-based interface.

Figure 3:
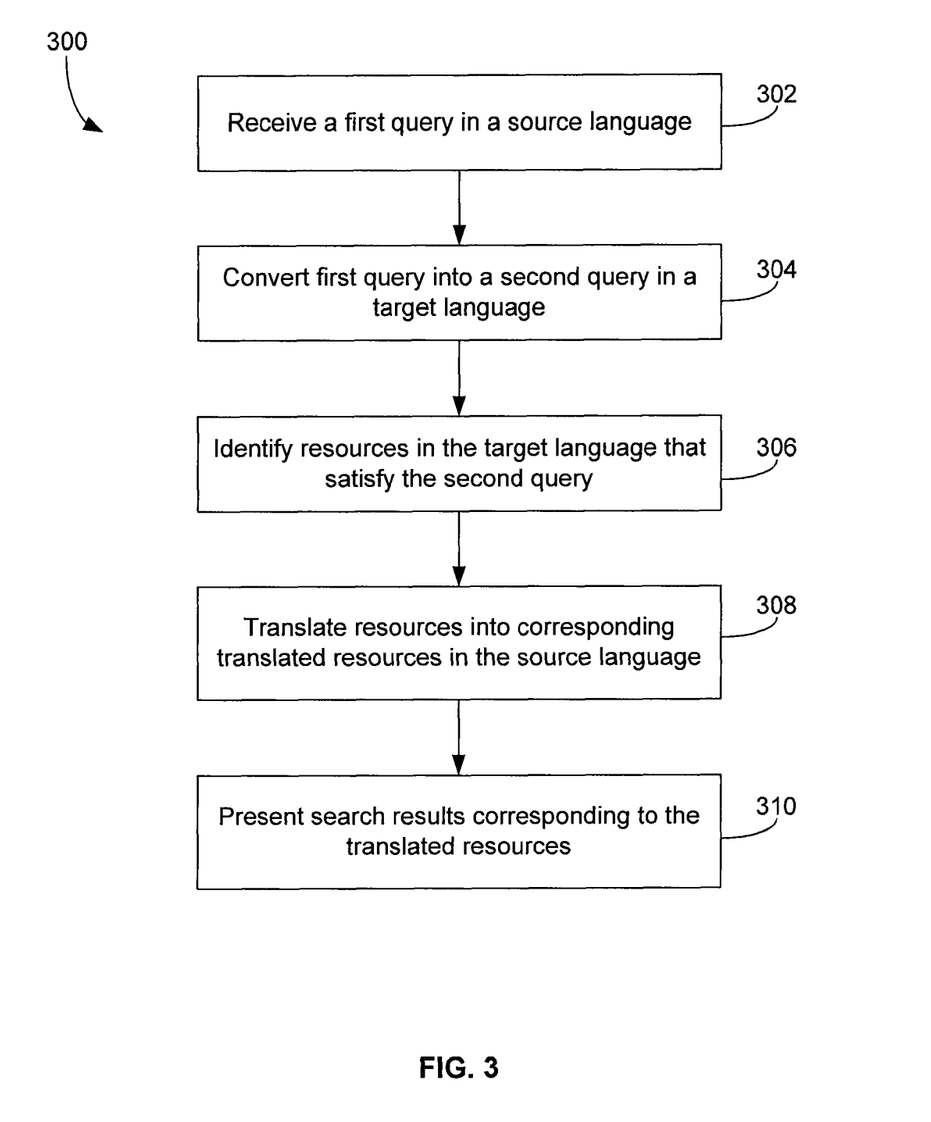
FIG. 3 is a flow diagram illustrating an example process for performing a cross-language search for content.

FIG. 3 illustrates a process 300 for performing a cross-language search for resources. The process 300 facilitates searching for resources in one language using a search query entered in another language. For convenience, the process 300 will be described below in reference to a system (e.g., CLIR system 200) that performs the process 300.

The system receives a query submitted by a user (302). A user at the user client 222 accesses the user interface generated by the CLIR front-end 218 and enters a query (the "source query") in a particular language (the "source language"). The source query is sent from the user client 222 to the CLIR engine 216. The user at the user client 222 also provides input specifying the source language and a target language, which are sent to the CLIR engine 216. For example, if the user submits a query written in English and wants to search for Japanese content, the user specifies English as the source language and Japanese as the target language. In some implementations, the source query can include content in two or more languages, forming a hybrid query (e.g., when the user has some knowledge of the target language, but not enough to form a complete query). For example, a user looking for hotels and restaurants near the opera house in Milan can submit a query that includes the name of the opera house in Italian: "hotels and restaurants near Teatro Alla Scala in Milano." The user can specify English as the source language and Italian as the target language in order to search Italian-language resources and have the search results presented in English.

The system converts the source query into a translated query (304) by translating the source query into the target language. For example, the CLIR module 220 sends the source query to the translation engine 210. The translation module 212 translates the source query, which is provided in the source language, to its translation in the target language. The translation engine 212 sends the translated query back to the CLIR engine 216.

If the query has multiple possible translations, the translation module 212 chooses one of multiple possible translations as the translated query. For example, in a translation engine that uses a model-based statistical machine translation technique, the translation that has the highest probability based on the language model can be selected as the translation. In some implementations, the other possible translations can be presented to the user, further details of which are described below. If the translation module 212 provides only one translation, that translation is used as the translated query.

In some implementations, the system can receive user input that modifies the translated query. For example, after the translated query is displayed to the user, the user can manually edit the translated query or select from one or more alternative translations of the source query and/or queries that are related to the translated query. In some implementations, the related queries are determined by the related queries module 206. The edited translated query or the selection from the related queries or alternative translations becomes the new translated query.

The system identifies resources in the target language that satisfy the translated query (the "original resources") (306). For example, the CLIR module 220 sends the translated query to the search engine 202. The search module 204 performs, using the translated query, a search in the index 208 for resources in the target language. The URLs of the identified resources, and optionally copies or extracts of the resources, are sent to the CLIR engine 216.

The system translates the identified original resources into corresponding translated resources in the source language (308). For example, the CLIR module 220 sends the URLs of the original resources to the translation engine 210. The translation module 212 retrieves the original resources from the URLs, translates the retrieved original resources, and sends the translated resources to the CLIR module 220.

In some implementations, the identified original resources are not translated in their entirety. Portions of the original resources (e.g., snippets of text in the resources, titles of the resources, hyperlink text, etc.) can be translated initially. When the user selects a search result corresponding to a translated resource, the entirety of the corresponding original resource is translated.

The system presents search results (310). In some implementations, the CLIR front-end 218 generates a search results page (e.g., user interface 400 (FIGS. 4A-4C)) from the translated resources in the source language and the original resources in the target language. The search results page includes hyperlinks to the translated resources and optionally portions of the content (e.g., snippets), in the source language, of the translated resources. The search results page can also include hyperlinks to the original resources and snippets of the original resources in the target language. The search results page is transmitted to the user client 222 for presentation to the user. In some other implementations, the search engine 202 generates the search results page and transmits the search results to the user.

In some implementations, the hyperlinks to the original resources and snippets of the original resources in the search results page can be hidden by the user. Additionally, the search results page optionally also displays the source query and the translated query.

In some implementations, the system identifies queries, in the target language, that are related to the translation of the source query (i.e., the translated query). In some implementations, the related queries module 206 identifies queries in the target language that are related to the translated query. The related queries can include synonyms of one or more terms in the translated query, combinations of the translated query and additional terms, rewordings of the translated query, acronyms of the translated query, reorderings of terms in the translated query, the translated query minus one or more terms, and so on. Estimated numbers of matching resources (i.e., estimated number of search results) and/or quality scores for the related queries can be determined. In some implementations, those related queries whose estimated number of matching resources is below a predefined threshold (e.g., 1000) can be disregarded. In some other implementations, those related queries whose quality scores are below a predefined threshold can be disregarded. The remaining related queries are presented to the user in the search results page, along with the translation, into the target language, of the source query (i.e., the translated query). The user can select one of the related queries to initiate a search using the selected related query.

In some implementations, the related queries module 206 identifies queries, in the source language, that are related to the source query. The related queries can include synonyms of one or more terms in the source query, combinations of the source query and additional terms, rewordings of the source query, acronyms of the source query, reorderings of the terms in the source query, the source query minus one or more terms, and so on. Estimated numbers of matching resources (i.e., estimated number of search results) and/or quality scores for the related queries can be determined. In some implementations, those related queries whose estimated number of matching resources is below a predefined threshold (e.g., 1000) can be disregarded. In some other implementations, those related queries whose quality scores are below a predefined threshold can be disregarded. The remaining related queries can be presented to the user in the search results page, along with the source query and the translation of the source query. The user can select one of the related queries to search using a translation, into the target language, of the selected related query. That is, the selected related query becomes the new source query.

Examples of the presentation of related queries are further described below, in reference to FIGS. 4B-4C.

Figure 6:
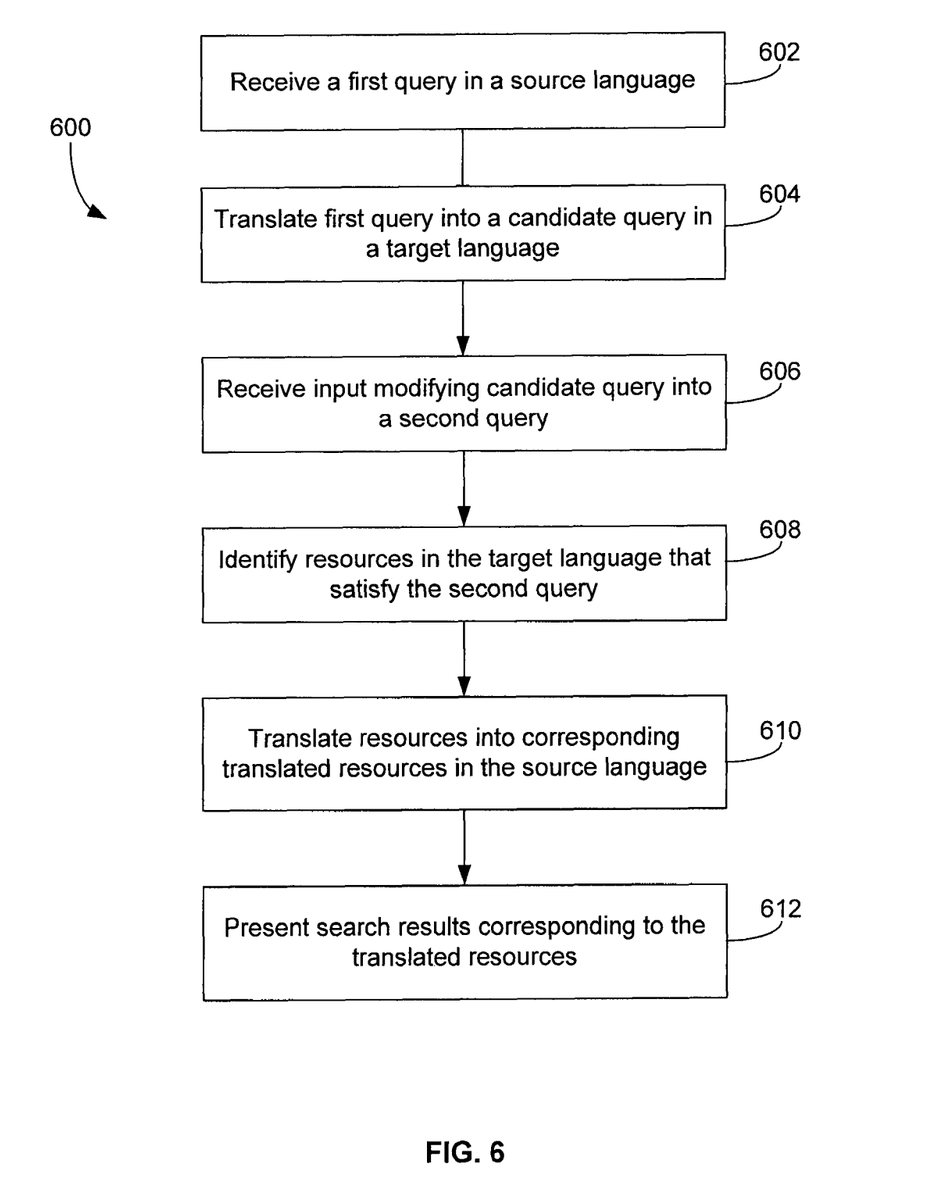
FIG. 6 is a flow diagram illustrating another example process for performing a cross language search for content.

FIG. 6 illustrates a process 600 for performing a cross-language search for resources. The process 600 facilitates searching for resources in one language using a search query entered in another language. For convenience, the process 600 will be described below in reference to a system (e.g., CLIR system 200) that performs the process 600.

The system receives a query submitted by a user (602). A user at the user client 222 accesses the user interface generated by the CLIR front-end 218 and enters a query (the "source query") in a particular language (the "source language"). The source query is sent from the user client 222 to the CLIR engine 216. The user at the user client 222 also provides input specifying the source language and a target language, which are sent to the CLIR engine 216. For example, if the user submits a query written in English and wants to search for Japanese content, the user specifies English as the source language and Japanese as the target language. In some implementations, the source query can include content in two or more languages, forming a hybrid query (e.g., when the user has some knowledge of the target language, but not enough to form a complete query). For example, a user looking for hotels and restaurants near the opera house in Milan can submit a query that includes the name of the opera house in Italian: "hotels and restaurants near Teatro Alla Scala in Milano." The user can specify English as the source language and Italian as the target language in order to search Italian-language resources and have the search results presented in English.

The system translates the source query to a candidate query in the target language (604). For example, the CLIR module 220 sends the source query to the translation engine 210. The translation module 212 translates the source query, which is in the source language, to its translation in the target language. The translation engine 212 sends the candidate query back to the CLIR engine 216. The candidate query can then be transmitted to the user client 222 for presentation to the user.

If the query can have multiple possible translations, the translation module 212 chooses one of the possible translations as the candidate query. For example, in a translation engine that uses a model-based statistical machine translation technique, the translation that has the highest probability based on the language model is selected as the translation. In some implementations, the other possible translations can be presented to the user, further details of which are described below. If the translation module 212 provides only one translation, that translation is used as the candidate query.

The system receives input modifying the candidate query into a modified query in the target language (606). The system can receive user input that modifies the candidate query. For example, after the source query is translated into the candidate query, the candidate query is presented to the user. One or more alternative translations of the source query or queries that are related to the candidate query can also be presented to the user. The user can modify the candidate query by manually editing the candidate query or selecting one from the alternative translations, into the target language, of the source query or queries, in the target language, that are related to the candidate query. The manually-edited candidate query or the selection from the related queries or alternative translations is the modified query.

In some implementations, the candidate query is also the translated query that is presented with search results in accordance with process 300. For example, in accordance with process 300, a source query is translated into a translated query and a search is performed using the translated query. The search results page can present the translated query in a text field, with which the user can edit the translated query. The search results page can also present a menu of alternative translations, into the target language, of the source query or queries, in the target language, that are related to the translated query. The user can edit the translated query, or select an alternative translation or a related query from the menu. The edited query or the selection from the menu is the modified query, with which a search can be performed as described below.

The system identifies resources in the target language that satisfy the modified query ("original resources") (608). For example, the CLIR module 220 sends the modified query to the search engine 202. The search module 204 performs, using the modified query, a search in the index 208 for resources in the target language. The URLs of the identified resources, and optionally copies or extracts of the resources, are sent to the CLIR engine 216.

The system translates the identified resources into corresponding translated resources in the source language (610). For example, the CLIR module 220 sends the URLs of the resources to the translation engine 210. The translation module 212 retrieves the resources from the URLs, translates the retrieved resources, and sends the translated resources to the CLIR module 220.

In some implementations, the identified resources are not translated in their entirety. Portions of the resources (e.g., snippets of text in the resources, titles of the resources, hyperlink text, etc.) can be translated initially. When the user selects a translated resource, the entirety of the corresponding resource is translated.

The system presents search results (612). In some implementations, the CLIR front-end 218 generates a search results page (e.g., user interface 400 (FIGS. 4A-4C)) from the translated resources in the source language and the original resources in the target language. The search results page includes hyperlinks to the translated resources and optionally portions of the content (e.g., snippets), in the source language, of the translated resources. The search results page can also include hyperlinks to the original resources and snippets of the original resources in the target language. The search results page is transmitted to the user client 222 for presentation to the user. In some other implementations, the search engine 202 generates the search results page and transmits the search results to the user.

Figure 4A:
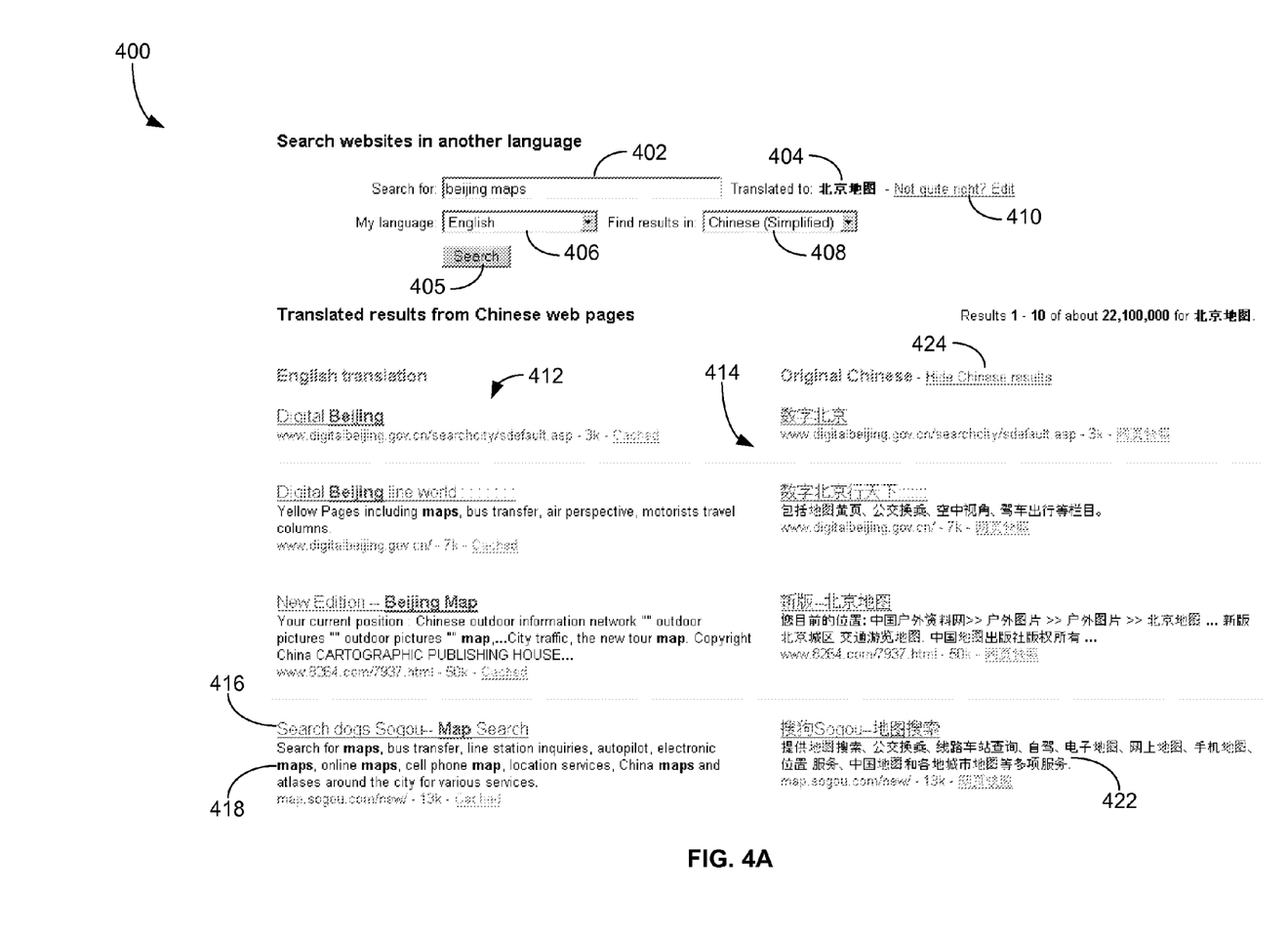
Figure 4C:
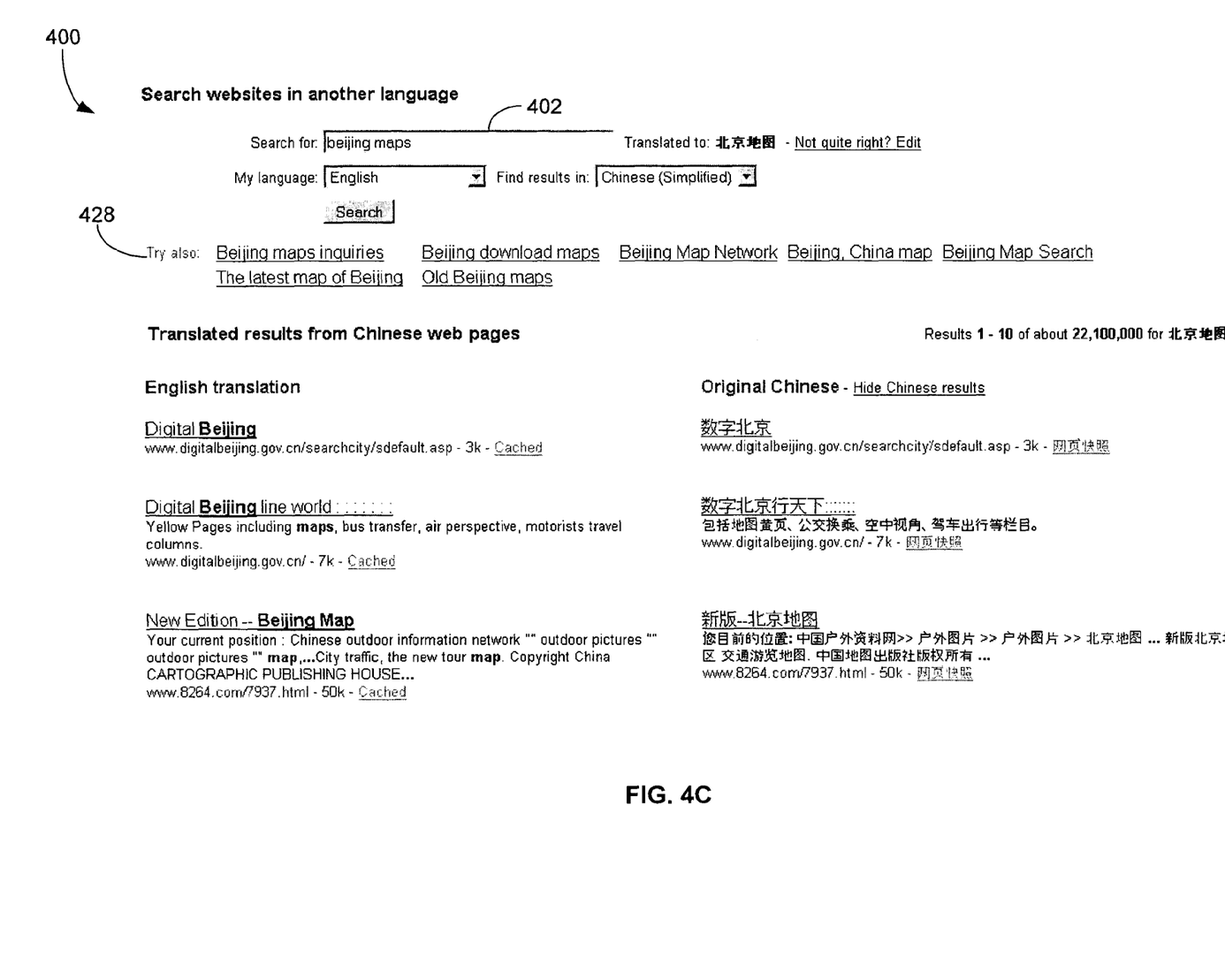

FIGS. 4A-4C illustrate an example user interface 400 for cross-language content search. In some implementations, the user interface 400 is a web-based interface. The interface 400 includes a search box 402, a source language selection menu 406, and a target language selection menu 408.

A query is entered in the search box 402. The query can be written in any one of the languages listed in the source language selection menu 406. In some implementations, the query is entered by a user into the search box 402 using an input method editor (IME). In some implementations, the IME is a program, application, module, or the like that allows a user to enter characters and symbols not associated with their input device (e.g., a keyboard). For example, a Chinese IME module can allow a user using a QWERTY keyboard to enter Chinese characters. The user also selects the source language in the source language menu 406 and a target language in the target language menu 408. For example, in FIG. 4A, the entered query is the English phrase "beijing maps." The source language, as indicated in the source language menu 406, is English. The target language, as indicated in the target language 408, is simplified Chinese. The query and the specifications of source language and target language are submitted when the user presses the "Search" button 405.

After the "Search" button 405 is pressed, the user interface 400 refreshes to display a translation 404 of the query entered into the search box 402. The displayed translation 404 is a translation of the entered query from the source language to the target language. The user interface 400 also includes an edit link 410, which the user can select to modify the translated query, further details of which are described below.

The refreshed user interface 400 also includes the search results 414 for the translated query and translated search results 412. The search results 414 present resources (e.g., webpages, etc.) in the target language that satisfy the translated query 404. The search results 414 include the hyperlinks 410 to the resources and optionally snippets 422 of the resources in the target language.

The translated search results 412 list translations, to the source language, of the resources that satisfy the translated query. In other words, the translated search results 412 correspond to translations of the resources that correspond to the search results 414. The translated search results 412 include the hyperlinks 416 to the translated resources and snippets 418, which can be translations of snippets 422.

In some implementations, the translated search results 412 and the search results 414 are displayed side-by-side in the interface 400, as shown in FIG. 4A. A listing of a resource in the search results 414 is lined up side-by-side with a listing of the corresponding translation of the resource in the translated search results 412. If a snippet is displayed for a search result (e.g., snippet 422), a translation of the snippet is displayed for the listing of the translated search result (e.g., snippet 418). Further, in some implementations, the search results 414 can be selectively hidden from view (e.g., by selecting the "hide results" link 424). Conversely, when the search results 414 are hidden, they can be un-hidden by selection, for example, of a "show results" link or other display mechanism.

In some other implementations, instead of the side-by-side display as shown in FIG. 4A, a listing of a resource is displayed inline with the listing of the corresponding translation. For example, a listing of the resource (e.g., the hyperlink, a snippet) in the target language can be displayed right below the listing of the corresponding translation. The listings of the resources can be hidden or un-hidden individually or all together.

If the user selects the edit link 410, the interface 400 refreshes to the interface 400 as shown in FIG. 4B. A translated query box 424 is displayed, with the translated query displayed in the box 424. A menu 426 of queries in the target language is also displayed. The query menu 426 displays queries, in the target language, that are related to the translated query and/or alternative translations of the source query in the search box 402. For example, the queries in the menu 426 can include synonyms of the translated query, combinations of the translated query and additional terms, rewordings of the translated query, acronyms of the translated query, alternative translations of the source query, and so forth. In some implementations, the menu 426 also displays, for each related query or alternative translation, an estimated number of resources that satisfy the query. For example, in the menu 426, the related query "北京地图查询 - Beijing maps inquiries" has about 12 million results (i.e., resources that satisfy the query in the target language). In an example implementation, the menu 426 displays only related queries and/or alternative translations whose estimated number of resources that satisfy the respective related query or alternative translation is above a predefined threshold (e.g., 1000).

The query in the translated query box 424 can also be edited by the user, using an input method editor (IME), for example. For example, if the user feels that the translated query is not the best translation, or if the user wishes to add additional terms to the translated query, the user can edit the translated query and submit the edited query for searching. The edited query becomes the new translation 404 of the source query and search results 412 that satisfy the edited query and translations 414 of the search results 412 are displayed.

In some implementations, the interface 400 can display queries related to the source query entered in the search box 402, as shown in FIG. 4C. The related queries 428 can include synonyms of the source query, combinations of the source query and additional terms, rewordings of the source query, acronyms of the source query, and so forth. When the user selects one of the related queries 428, the selected query becomes the new source query.

Figure 5:
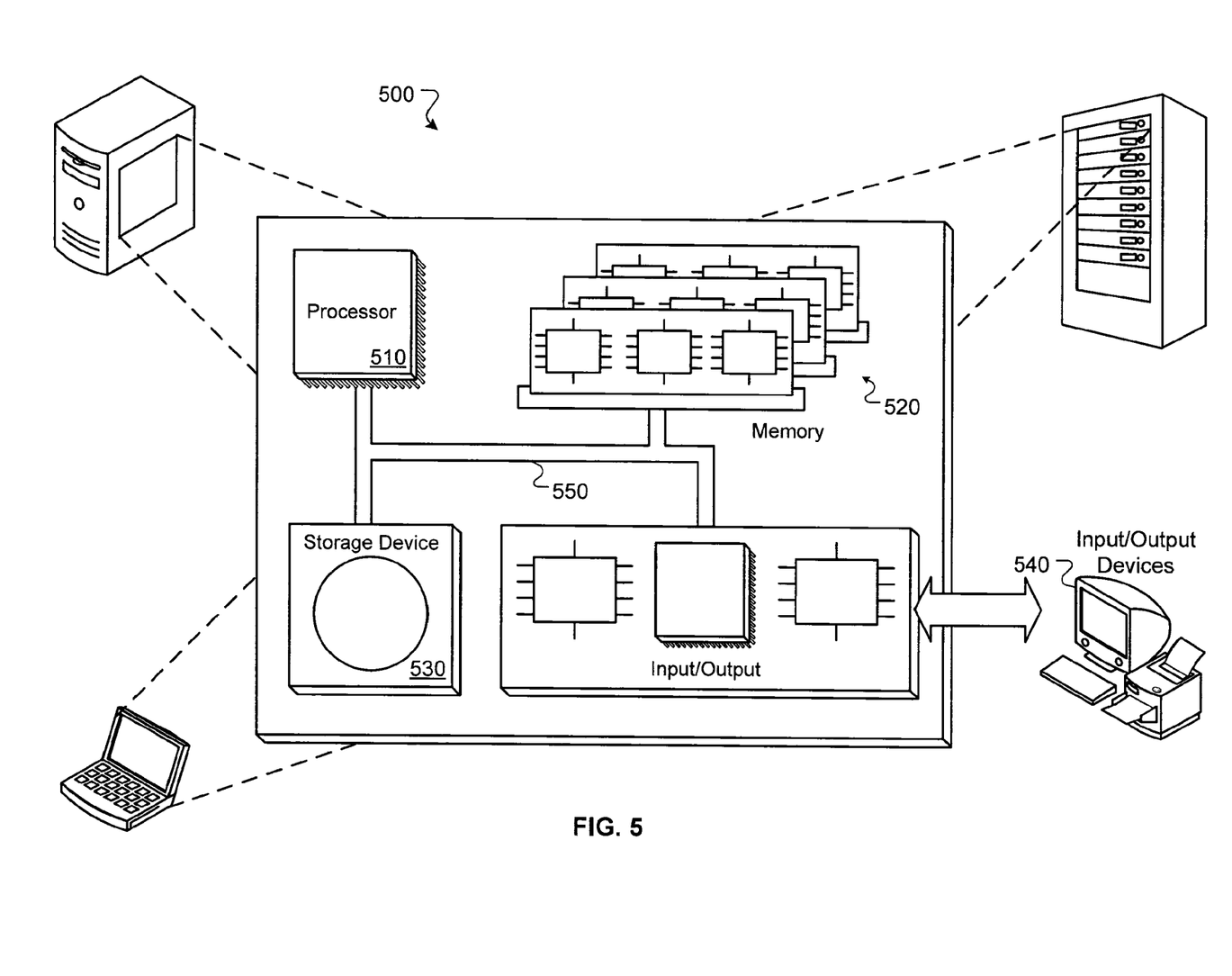
FIG. 5 is a block diagram illustrating an example computer system.

FIG. 5 is a schematic diagram of a generic computer system 500. The system 500 can be used for practicing operations described in association with the technique 300. The system 500 can include a processor 510, a memory 520, a storage device 530, and input/output devices 540. Each of the components 510, 520, 530, and 540 are interconnected using a system bus 550. The processor 510 is capable of processing instructions for execution within the system 500. Such executed instructions can implement one or more components of search engine 202, translation engine 210, and/or CLIR engine 216, for example. In some implementations, the processor 510 is a single-threaded processor. In other implementations, the processor 510 is a multi-threaded processor. The processor 510 is capable of processing instructions stored in the memory 520 or on the storage device 530 to display graphical information for a user interface on the input/output device 540.

The memory 520 is a computer readable medium such as volatile or non-volatile memory that stores information within the system 500. The memory 520 could store data structures representing content index 208 or language model 214, for example. The storage device 530 is capable of providing persistent storage for the system 500. The storage device 530 may be a floppy disk device, a hard disk device, an optical disk device, or a tape device, or other suitable persistent storage means. The input/output device 540 provides input/output operations for the system 500. In some implementations, the input/output device 540 includes a keyboard and/or pointing device. In other implementations, the input/output device 540 includes a display unit for displaying graphical user interfaces.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:
1. A method comprising:
receiving a source query in a source language;
translating the source query into a candidate query in a first target language different from the source language;
identifying one or more resources in the first target language that satisfy the candidate query;
translating the identified resources into corresponding translated resources in the source language;
presenting search results corresponding to the translated resources along with the candidate query;
receiving input modifying the presented candidate query into a first target query in the first target language;
identifying one or more resources in the first target language that satisfy the first target query;
translating the identified resources into corresponding translated resources in the source language; and
presenting updated search results corresponding to the translated resources including presenting, inline after each search result, a corresponding search result in the first target language, where each individual search result in the first target language is selectably presented or hidden in response to a user input.

2. The method of claim 1, further comprising presenting, with the search results, snippets, in the source language, of one or more of the translated resources.

3. The method of claim 2, further comprising presenting, for a respective snippet of a respective translated resource, a corresponding snippet of a respective resource in the first target language, wherein the respective translated resource is a translation of the respective resource.

4. The method of claim 1, wherein translating the source query into a candidate query comprises:
selecting as the candidate query one of one or more candidate translations, in the first target language, of the source query.

5. The method of claim 4, wherein receiving input modifying the candidate query into a first target query comprises:
receiving input selecting as the first target query one of the candidate translations different from the candidate query.

6. The method of claim 1, further comprising:
generating one or more queries related to the source query; and
translating the queries related to the source query into one or more candidate related queries in the first target language;
wherein receiving input modifying the candidate query into a first target query comprises receiving input selecting as the first target query one of the candidate related queries.

7. The method of claim 1, further comprising:
identifying one or more queries related to the candidate query;
wherein receiving input modifying the candidate query into a first target query comprises receiving input selecting as the first target query one of the queries related to the candidate query.

8. The method of claim 1, receiving input modifying the candidate query into a first target query comprises:
receiving user input editing the candidate query into the first target query.

9. A method comprising:
receiving one or more user inputs specifying a source language, a query in the source language, and a target language;
presenting a translation of the query into the target language along with translations, into the source language, of one or more search results, in the target language, that satisfy the query;
receiving a user input modifying the presented translation of the query;
presenting translations, into the source language, of one or more updated search results, in the target language, that satisfy the modified translation of the query; and
selectably presenting inline after each search result, a corresponding search result in the target language, where each individual search result in the target language is selectably presented or hidden in response to a user input.

10. The method of claim 9, wherein presenting a translation of the query further comprises presenting one or more queries, in the target language, related to the translation of the query.

11. The method of claim 10, wherein the queries, in the target language, related to the translation of the query comprises at least one of the group consisting of: synonyms of the translation of the query, acronyms of the translations of the query, alternative translations of the query from the source language into the target language, and combinations of the translation of the query and one or more additional terms.

12. The method of claim 10, wherein receiving the user input modifying the translation of the query comprises receiving a user input selecting one of the queries, in the target language, related to the translation of the query.

13. The method of claim 9, wherein receiving the user input modifying the translation of the query comprises receiving a user input editing the translation of the query.

14. The method of claim 9, wherein presenting translations of one or more search results comprises presenting snippets, in the source language, of the translations of the search results.

15. The method of claim 9, wherein presenting the search results, in the target language, that satisfy the modified translation of the query comprises presenting snippets, in the target language, of the search results.

16. A method comprising:
displaying a search interface on a display device, the search interface including:
a first field for receiving a first user input of a query,
a second field for receiving a second user input specifying a source language of the first user input from a plurality of source languages, and
a third field for receiving a third user input specifying a target language from a plurality of target languages;
based on the first, second, and third user inputs, generating a first results interface and displaying the first results interface on the display device, the first results interface including:
one or more first translated search results responsive to a translation of the query into the target language,
a translation, into the target language, of the query, and
a fourth field for receiving a fourth user input modifying the translation of the query; and
based on the first, second, third, and fourth inputs, generating a second results interface and displaying the second results interface on the display device, the second results interface including:
translations, into the source language, of one or more second search results, in the target language, that satisfy the modified translation of the query, and
inline after each translated second search result, a selectably presented corresponding search result in the target language, where each individual search result in the target language is selectably presented or hidden in response to a user input.

17. A system, comprising:
one or more processors; and
instructions configured for execution by the one or more processors, the instructions comprising instructions to:
receive a source query in a source language;
translate the source query into a candidate query in a first target language different from the source language;
identify one or more resources in the first target language that satisfy the candidate query;
translate the identified resources into corresponding translated resources in the source language;
present search results corresponding to the translated resources along with the candidate query;
receive input modifying the presented candidate query into a first target query in the first target language;
identify one or more resources in the first target language that satisfy the first target query;
translate the identified resources into corresponding translated resources in the source language; and present updated search results corresponding to the translated resources including presenting, inline after each search result, a corresponding search result in the first target language, where each individual search result in the first target language is selectably presented or hidden in response to a user input.

18. A computer program product, encoded on a machine-readable storage device or substrate, operable to cause data processing apparatus to perform operations comprising:

receiving a source query in a source language;

translating the source query into a candidate query in a first target language different from the source language;

identifying one or more resources in the first target language that satisfy the candidate query;

translating the identified resources into corresponding translated resources in the source language;

presenting search results corresponding to the translated resources along with the candidate query;

receiving input modifying the presented candidate query into a first target query in the first target language;

identifying one or more resources in the first target language that satisfy the first target query;

translating the identified resources into corresponding translated resources in the source language; and presenting updated search results corresponding to the translated resources including presenting, inline after each search result, a corresponding search result in the first target language, where each individual search result in the first target language is selectably presented or hidden in response to a user input.

19. A system, comprising:

one or more computing devices configured to perform operations comprising:

receiving a source query in a source language;

presenting translations, into the source language, of one or more search results, in the target language that satisfy the query;

presenting a translation of the source query into a candidate query in a first target language different from the source language;

receiving input modifying the candidate query into a first target query in the first target language;

identifying one or more resources in the first target language that satisfy the first target query;

translating the identified resources into corresponding translated resources in the source language; and presenting updated search results corresponding to the translated resources including presenting, inline after each search result, a corresponding search result in the first target language, where each individual search result in the first target language is selectably presented or hidden in response to a user input.

* * * * *